June 2, 1931. T. BADER 1,808,718
HEATING MEANS FOR CASTING POTS
Filed March 29, 1928 4 Sheets-Sheet 1

Inventor,
Theodor Bader,

June 2, 1931.  T. BADER  1,808,718
HEATING MEANS FOR CASTING POTS
Filed March 29, 1928  4 Sheets-Sheet 2

Inventor
Theodor Bader,
By
Atty.

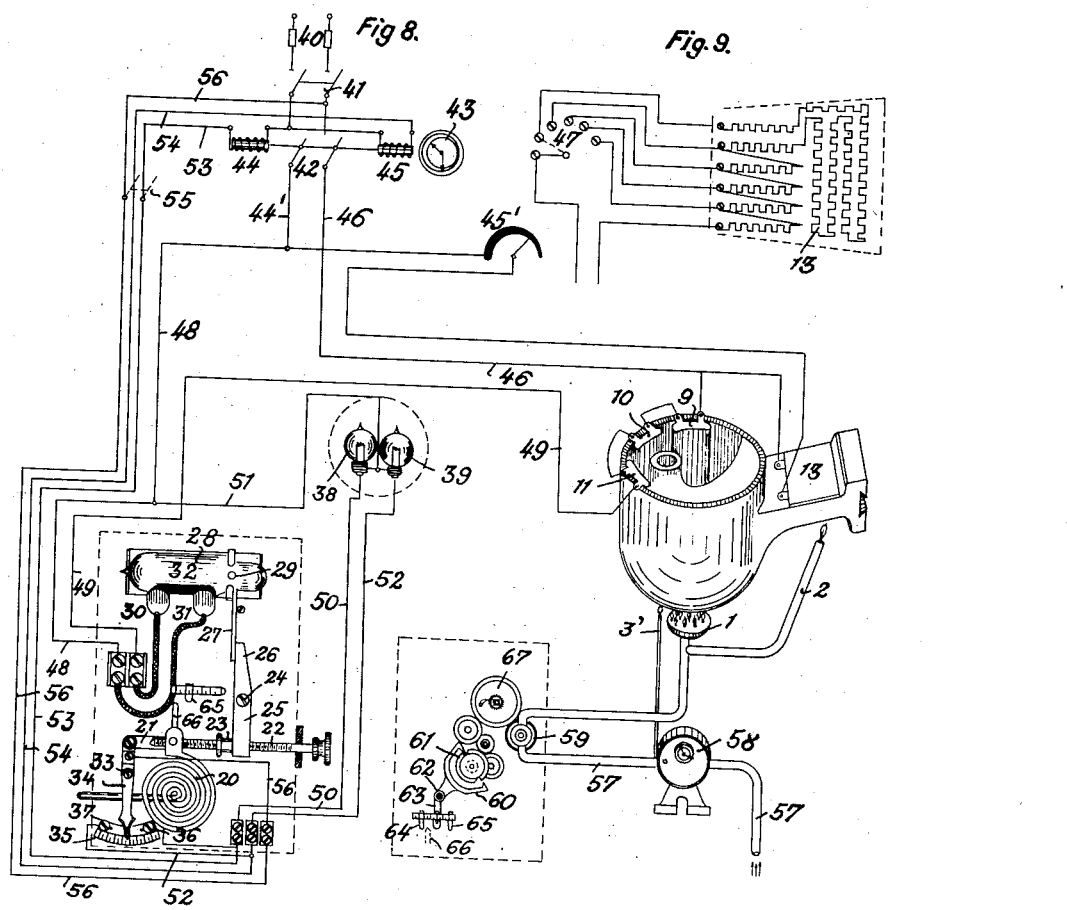

Patented June 2, 1931

1,808,718

UNITED STATES PATENT OFFICE

THEODOR BADER, OF WALDSHUT, GERMANY

HEATING MEANS FOR CASTING POTS

Application filed March 29, 1928, Serial No. 265,668, and in Germany February 27, 1928.

This invention concerns improvements in or relating to the heating of the casting pots employed in the well known linotype composing and the like machines and resides in so constructing the heating means that the type metal may be heated simultaneously by gas and electricity without any alteration, adjustment or the like of the apparatus. The heating may also be effected alternatively with gas or electricity and the changeover from one manner of heating to the other effected automatically.

The casting pot heating means hitherto known were either expressly gas heating arrangements or electrical heating arrangements. Each of said heating arrangements however required casting pots wholly different from one another in shape and appearance. Whereas the gas heated casting pots had to be of very pronounced arch-shape to give the gas flames the most extensive contact surfaces possible and a number of good draught passages had to be provided for the gases of combustion, in the case of casting vessels which were electrically heated all draught passages were, on the contrary, avoided and the pots constructed with smooth plane surfaces, instead of the arched shapes, in order to provide for the satisfactory fitting of the electrical heating elements and so to ensure the efficient transmission of the heat.

Electrical heating arrangements are also known which provide both for gas heating and for electrical heating. The changeover from one manner of heating to the other can however only take place after a number of alterations have been made. Either the draught passages for the gas heating must be replaced in position or it is necessary first to remove the electrical heating elements in order to create contact surfaces for the gas elements. In practice however this is a great disadvantage.

The change over from electrical heating to gas heating usually takes place when the supply of electrical energy has failed, as is not infrequently the case with long distance transmission from a power station. If failure occurs then the type metal begins to cool immediately and only a few minutes later composing with the machine is impossible. An interruption which lasts perhaps only ten minutes may cause the type metal to cool to its solidification point and when the electrical current has been reestablished it is often as much as half an hour before the machines again are raised to normal working temperature ready for composing. An interruption of half an hour, however, in the operation of composing machines may easily endanger the entire day's edition of a newspaper. To eliminate this defect it is therefore necessary that the gas heating may be brought into action immediately the electrical current fails.

It is known furthermore that the temperature of the vessel must be maintained constant if clear cast lines of type are to be obtained. If now the heating power, with either gas heating or electrical heating, should fail due to bad gas pressure or falling off in the voltage then in spite of the automatic temperature control the lines produced may not be up to standard since the regulation although it may tend to maintain the metal at a constant temperature is not capable of making up energy which is lacking.

Furthermore overheating is possible both with gas and electricity in spite of the automatic temperature control. This applies in particular to heated machines which however are not in use, wherein the throttled-down heat supply is still sufficient to overheat the metal. In all the known electrical heating arrangements the compositor could not observe that this was happening and did not know when he had abnormally heated metal. Being occupied with his work, hitherto he only realized the cooling or overheating of his metal when the pumping gear ceased to work correctly or from examination of the lines. Usually however this warning came too late and as a result dozens of unsatisfactory lines had to be rejected.

A further defect observed in the previous heating arrangements for composing machines was the irregular heating of the mouth and mouth passage of the casting vessel. A considerable quantity of heat is taken from the mouth passage by the two mounting projections by which the casting vessel is suspended in its housing jacket so that the regulation of the heating element for said mouth must take account of this fact and if necessary more heat must be supplied to the corners.

Particularly with lines of wide type and great point thickness it must be possible to increase the supply of heat at the two outer edges and to reduce it, on the other hand, at the centre of the casting mouth since the hot metal flowing through the centre of said casting mouth will be hotter by a corresponding extent. In multiple magazine machines in which the type is frequently altered several times a day the heating element for the casting mouth must be capable of regulation within wide limits. The arrangement of the element, namely whether above or below the throat of said casting mouth, then plays a less important part.

The present invention enables the defects described to be completely obviated. The heating arrangement is constructed with electrical heating means incorporated in the existing casting body in such a manner that no modifications of the gas heating means are necessary. In particular the draught passages employed with the gas heating means are retained completely. The heating arrangement is so contrived that gas and electricity may not only be employed alternatively but also together. This has the great advantage that in cases of urgency the initial heating up may be effected with gas and electricity and the normal initial heating up period reduced to a half. The arrangement may, moreover, be such that, when alternative heating is employed, one manner of heating comes into operation automatically immediately the heating power of the other is no longer sufficient. If for example the heating is effected with gas and the gas pressure falls off or fails entirely, then the electrical heating is switched on automatically as an auxiliary supply to the gas heating and will assist the latter until the normal heating power is reinstated. Vice versa, if the electrical supply falls off due to low voltage then the gas heating will come to its assistance until normal voltage is again available.

The automatic temperature controlling means known hitherto for composing machines are improved in the present invention and take the form of a universal instrument which has to effect the following operations:

1. The switching, in a purely mechanical manner without relays or the like, of the electrical current on the attainment of the maximum and minimum temperatures.

2. The switching over purely automatically from gas to electricity or from electricity to gas, or simultaneously to gas and electricity in a fully arbitrarily adjustable manner, at the same time automatically controlling the temperature of the metal in each individual case.

3. The visible indication of the vessel temperature to the compositor.

4. The visible or audible indication to the compositor of abnormal working temperatures at which the danger arises of badly cast lines being produced. Further a signal indication when switching over from gas to electricity or vice versa takes place.

The electrical heating elements are so constructed that they do not interfere with the manner of operation of the gas burner and leave open the draught passages for the gas flames. There are in the interior of the vessel submerged elements of arched shape, which may be interchanged or replaced even when the metal bath is solid. The heating element for heating the casting mouth passage and the casting mouth is in the form of a flexible element. This is necessary to enable the element to be readily adapted or fitted snugly to any existing surface, particularly as the surfaces of the throat of the casting mouth of a composing machine are freuently of irregular shape.

Three series of special press screws, of which one row is arranged at each of the outer edges of the heating element and one row in the centre thereof, enable the heat transmission from the heating element to the casting mouth passage to be controlled by their adjustment. Furthermore, the provision of a five or more step regulable resistance forming part of the heating element itself renders the said heating element controllable to an even greater extent, so that every conceivable manner of regulation is available in practice. An adjusting screw allows of the element being set closer to or farther from the passage and the heat transfer to be increased or reduced accordingly.

The heating elements in the casting pot are regulated by the automatic temperature control while the casting-mouth element and, which is even more important, the element in the chimney frequently provided on the casting pot in the case of gas heating, are maintained in continuous operation. This last mentioned heating element is of special construction. In order that the chimney shall remain open for gas heating the said element is of tubular shape; it has moreover to deal with the most important part of the heating, namely that of the pump cylinder and plunger. Immediately this cylinder is no longer correctly heated the part of the metal on the pump plunger solidifies and bad line casting then results. For this reason said heating element is constructed in such a manner as to give a particularly strong heating action and is maintained continuously in operation.

One embodiment of the invention is illustrated by way of example in the accompanying drawings, in which:

Fig. 8 is a general circuit diagram of the apparatus and

Fig. 9 is a circuit diagram of a resistance for a heating element.

Figure 1:
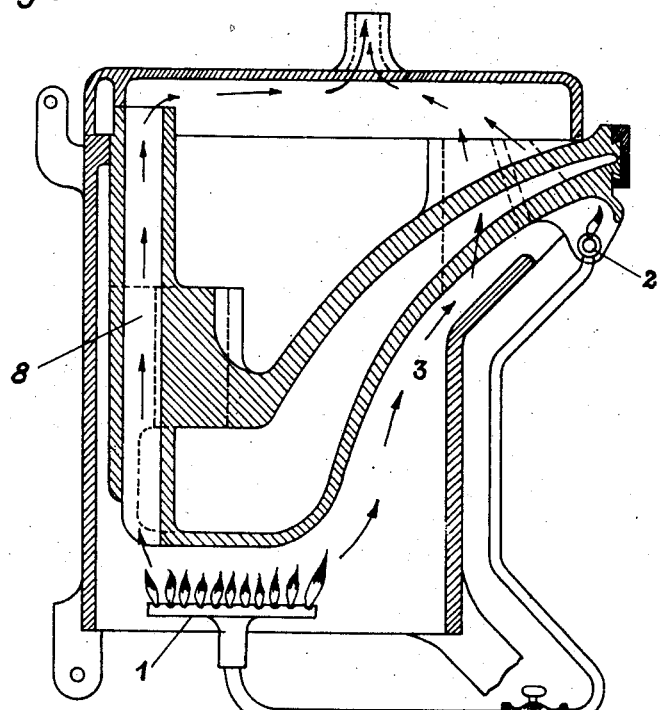
Fig. 1 is a longitudinal section through the casting pot of a known composing machine showing its jacket and the various parts as they are generally employed for gas heating.
Figure 2:
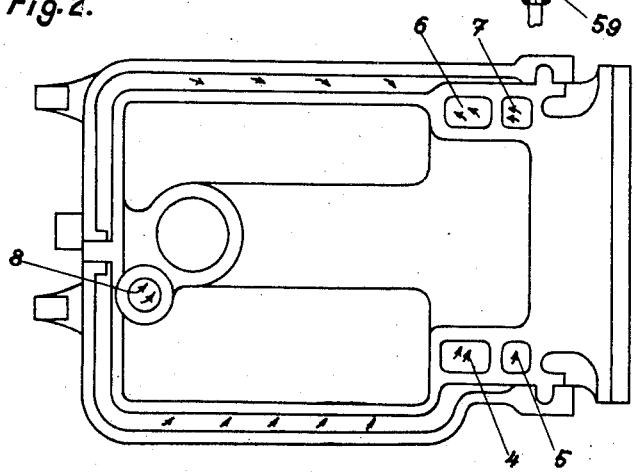
Fig. 2 is a corresponding plan view.

Figs. 1 and 2 illustrate an ordinary casting pot heated by gas. The flames from the burners 1 and 2, of which the burner 1 deals with the heating of the actual casting pot and the burner 2 with the heating of the casting mouth, are drawn in the direction of the arrows through the various passages 3, 4, 5, 6, 7 and 8 and thence pass into the chimney. Special attention is paid to the heating of the draught passage 8, since it heats the most important part of the casting pot, namely the cylinder.

Figure 3:
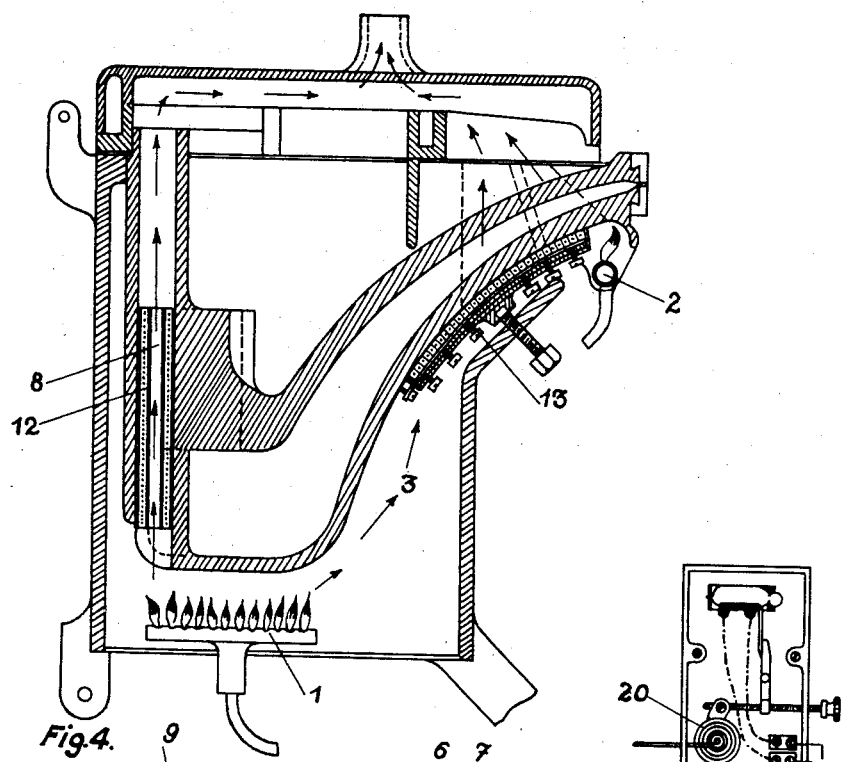
Fig. 3 is a sectional view similar to Fig. 1 showing the electrical heating means mounted in position.
Figure 4:
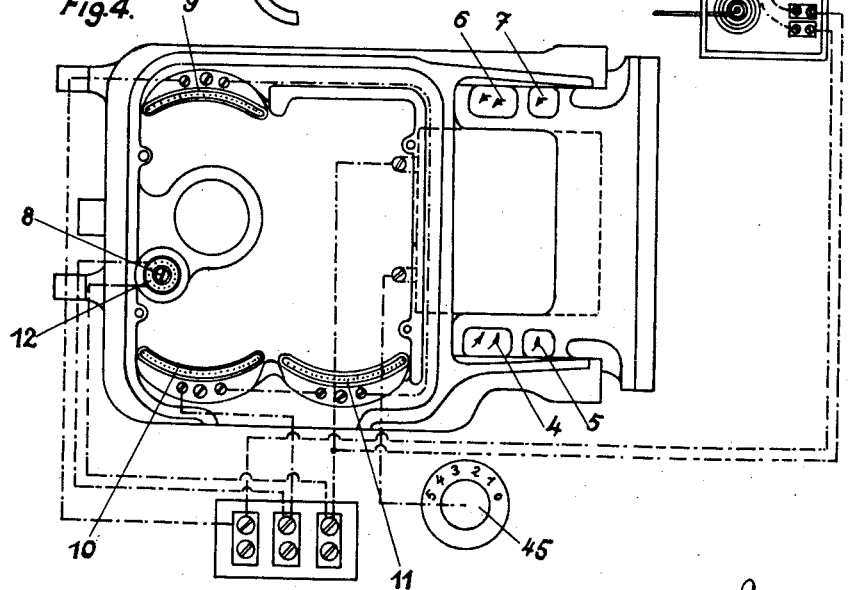
Fig. 4 is a plan view corresponding to Fig. 3 showing the automatic temperature control and the separate means for controlling the heating of the casting mouth.
Figure 5:
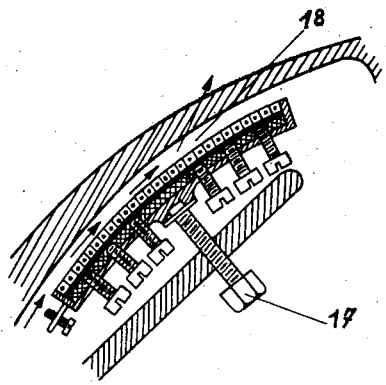
Fig. 5 is a sectional view of a flexible heating element for the casting mouth.
Figure 6:
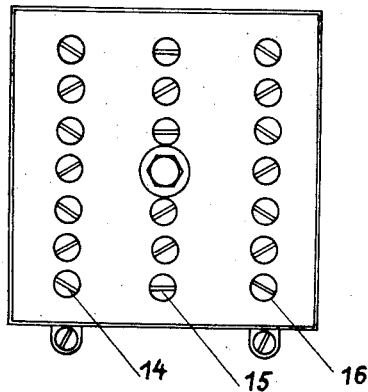
Fig. 6 is a view thereof from below.
Figure 7:
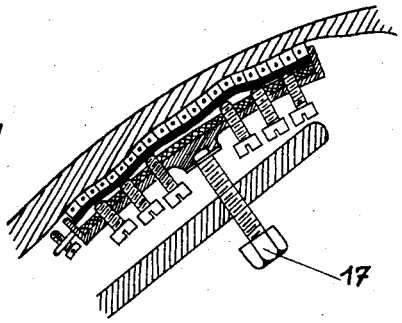
Fig. 7 illustrates this element arranged on the casting mouth.

Figs. 3 and 4 illustrate the electrical heating means built into the existing gas heating arrangement. The burners 1 and 2 remain in position without the slightest modification and the draught passages 3, 4, 5, 6, 7 and 8 also remain unaltered. The heating elements 9, 10 and 11 rest, in such a manner as to be readily replaceable, in pockets of arcuate shape in the interior of the casting pot. The tubular heating element 12 is arranged in the passage 8 in such a manner as not to interfere with the draught through the said passage. Similarly, the flexible heating element 13 is mounted on the casting mouth passage without blocking the draught in the passage 3. The construction of this flexible element is illustrated in further detail in Figs. 5, 6 and 7.

The heating element is composed of separate parts and is designed for ready adaptation to the casting mouth passage, which will be variously shaped in various individual pots. It is even capable of being arranged satisfactorily on rough and uneven surfaces such as are shown by way of example in Fig. 7. Due to the provision of rows of screws 14, 15 and 16, the heating element may be set to a greater or less extent, as desired, towards the one or other outer edge or the middle. In this manner it is possible to influence the heat transfer from the heating element to the casting mouth passage by strengthening or weakening the same to a greater or less extent. By means of the screw 17 it is even possible to remove the element wholly away from the passage in order to reduce the heat transfer to the very smallest possible amount due to the layer of heat insulating air thus created (the passage 18 in Fig. 5).

The general arrangement may be seen from Fig. 8. The controlling means are characterized by a device consisting mainly of a mercury filled spiral 20 which is connected by a tube with the melting chamber of the casting pot so that said spiral 20 is influenced by the varying temperature of the contents of the pot. The spiral acts on a rod 21 on which is mounted a nut 23 displaceable by means of a screw 22. One end 25 of a lever which is rotatable about a point 24 bears on said nut while the other end 26 thereof bears against a lever 27, connected with a tipping switch 28. Said tipping switch consists of a glass tube which is rotatable about the point 29, and has contacts at 30 and 31. When the glass tube is in a horizontal position the two contacts are connected together by mercury located in the interior of the tube. The rod 21 also engages with an indicator 34 which is pivoted at 33 and moves over a scale 35 provided at its end points with contacts 36 and 37. The object of these contacts is to cause the lighting up of two signal lamps 38 and 39 on the attainment of the minimum or maximum temperatures; alternatively, or in addition, they may be employed to actuate any other kind of optical or acoustical signal.

The manner of operating this device is as follows:

It will be assumed that to start with the casting pot is heated electrically only. The connection to the electrical mains is at 40, and a hand operated switch 41 is provided whereby the apparatus may be closed on to or isolated from said mains. A second switch 42 is provided which may be operated either also by hand, or with the aid of a clockwork 43 which is associated with said switch and is adapted to open or close the same at a predetermined time, which may be set at will. The said switch 42 may also be opened or closed automatically by means of two electromagnets 44 and 45 when, on the attainment of the maximum or minimum allowable temperature in the casting pot, the indicator 34 comes to bear against one of the contacts 36 or 37.

The two switches 41 and 42 being closed, the current passes from the line 44' first through the regulatable resistance 45' to the heating resistance 13 for the casting mouth of the casting pot and thence back by way of the line 46. As long, therefore, as the two switches 41 and 42 are closed, current will be supplied also to the heating element 13 for the casting mouth. The adjustable resistance 45', may however, also be constructed, as illustrated in Fig. 9, in such a manner that the individual heating strips of the element 13 may be switched in or out successively by the switch 47.

From the line 44' branches a connection 48 leading to the contact 31 of the tipping switch 38. From said contact the current flows through the mercury layer 32, to the contact 30 and by way of the line 49 to the other heating elements 11, 10 and 9 of the casting pot and thence back by way of the line 46. These heating elements, to which may also be added the heating element 12 illustrated in Figs. 3 and 4, are therefore only supplied with current when the layer of mercury 32 connects the two contacts 31 and 30 together, that is when the tipping switch 28 is horizontal. The indicator 34 is then still on the contact 36, since the normal temperature in the casting pot has not yet been attained. The contact 36 is connected by way of a line 50 to a lamp 38, so that the latter burns until the normal temperature has been attained, that is, until the indicator 34 leaves the contact 36. The lamp 38 is connected to the line 48 by a connection 51.

If now the temperature rises then the indicator 34 moves, as stated, away from the contact 36 and approaches contact 37 which it will reach on the attainment of the maximum allowable temperature in the interior of the casting pot. Two things will then happen; firstly, since the rod 21 will have moved to a corresponding extent the lever 25 will have been rotated about 24 by the nut 23 so that its free end 26 will have raised the lever 37 and rotated the tipping switch 28 about its pivot 29. Said tube or switch 28 being then in an inclined position the mercury 32 will leave contact 30, whereby the current in the lines 48 and 49 will be interrupted and the heating elements 9, 10, 11 and possibly 12 thus set out of operation. The moment at which the switching off will occur may be adjusted by means of the nut 23.

The second result of the contact between the indicator 34 and the contact 37 is that the lamp 39 will be supplied with current by way of the line 52 and will indicate that the maximum temperature has been arrived at or exceeded. The lamp will burn as long as the indicator 34 is in contact with 37.

If the temperature in the casting pot falls again then the mercury spiral 20 will move accordingly, displace in turn the rod 21 to the left, and thus return the tipping switch 28 to its original horizontal position with the aid of the levers 25 and 27; the contacts 30 and 31 are bridged once more by the mercury 32 and the circuit through the heating elements 9, 10, 11 (and 12) closed again.

From the contacts 36 and 37 there are also connections 53 and 54 to the electromagnets 44 and 45 which serve to open and close the switch 42 and thus to control the electrical heating by all the heating elements. This arrangement is employed if, when operating the casting pot normally solely with gas, the temperature should fall below the normal value due to lack of pressure in the gas mains and it should thus become desirable for the electrical heating to be switched on as an auxiliary. The arrangement may be switched on to or off from the said lines by means of a hand switch 55. Said arrangement may also be employed if, when both manners of heating are employed simultaneously, the maximum temperature is attained and the electrical heating must be switched off. The line 56 connects the indicator 34 with one main.

For gas operation pure and simple the burner 1, provided with a pilot jet 3', is employed to heat the casting pot itself and the burner 2 to heat the casting mouth, the latter burner also having a suitable pilot flame not shown. The gas supply pipe 57 contains a gas clock 58 and has a cock 59 which is controlled automatically by clockwork. This clockwork is obstructed in its movement by an armature 60 having two points adapted to engage in corresponding cut away portions in a locking wheel 61. The armature is rotatable about its pivot 62 and carries an arm 63 on which two stops 64 and 65 are adjustably mounted. These stops are adapted to be displaced by a projection 66 mounted on the rod 21 or the screw 22 and thus to be moved in the one or other direction by the spiral 20. If in moving to the right or left the projection 66 contacts with the stop 65 or the stop 64 then the lever 63, and with it the armature 60, is deflected to a corresponding extent so that the locking wheel 61 is released and rotates under the action of the clockwork 67 which simultaneously moves the cock 59 through a half rotation. Meanwhile the other point of the armature 60 has snapped into the locking wheel 61 and holds it stationary after a half rotation. In this manner the gas supply pipe is opened and closed according as to whether the minimum or maximum allowable temperature has been attained in the casting pot.

If on the attainment of the minimum temperature the electrical heating means are to be switched on automatically it is merely necessary to close the switch 55; then on the contact of the indicator 34 with the contact 36, the switch 42 will be closed by the electromagnet 44 and the current will be supplied to the various heating elements. If now the maximum temperature is reached and the indicator 34 arrives over the contact 37 the electromagnet 45 will open the switch 42 in a similar manner and thus disconnect all the heating elements.

Thus it will be seen that if the machine is being heated by gas only and proper temperature of the casting metal is obtained, the movable contact 34 lies between contacts 36 and 37, and the lamp circuits are open to prevent lamps 38, 39 from burning. Now if the gas supply is not sufficient to keep up the temperature of the pot the contact 34 engages contact 36. The lamp 38 burns to indicate that the other type of heating has been applied. Now assume that the pot is heated electrically and that the current is insufficient. Contacts 34 and 36 close as before, the lamp 38 burns as before, projection 66 strikes stop 65 to move anchor 60 and release clock work 67 to open the gas valve 59. The same thermostatic device 20 operates both the electrical and the gas heating means.

Particularly for initial heating up both ways of heating may be employed together in order to shorten the heating up period.

With the aid of the switch clock 43 or the gas clock 58 it is possible to cause the automatic switching on or off or switching over to be effected at predetermined times of day and thus to adapt the energy used to the more favourable tariff.

What I claim is:—

1. The combination with a melting pot for typographic machines; of both gas heating means and electric heating means for the pot, and control mechanism common to both of said heating means to automatically render one of said means operative when the other fails.

2. The combination with a melting pot for typographic machines and gas heating means therefor; of an electric heater for the pot, and operating circuits for the electric heater, control means for the gas heating means, means dependent upon the condition of the metal in the pot to release said control means, and an electric switch operated by said dependent means to switch off and on the electric heater.

3. The combination with a melting pot for typographic machines and gas heating means therefor; of an electric heater for the pot, and operating circuits for the electric heater, control means for the gas heating means, means dependent upon the condition of the metal in the pot to release said control means, and an electric switch operated by said dependent means to switch off and on the electric heater, and adjustable means to control the time during which said electric heater is on with respect to the time the gas heater is on.

4. The combination with a melting pot for typographic machines and gas heating means therefor; of an electric heater for the pot and operating circuits for the electric heater, control means for the gas heating means, means dependent upon the condition of the metal in the pot to release said control means, and an electric switch operated by said dependent means to switch off and on the electric heater, and means to adjust the time said control means is operated with respect to the operation of the electric heater.

5. The combination with a melting pot for typographic machines and gas heating means therefor; of an electric heater for the pot and operating circuits for the electric heater, control means for the gas heating means, means dependent upon the condition of the metal in the pot to release said control means, and an electric switch operated by said dependent means to switch off and on the electric heater, means to control the operation of said switch, and separate means to vary the operation of the gas control means.

6. The combination with a melting pot for typographic machines and gas heating means therefor; of an electric heater for the pot and operating circuits for the electric heater, control means for the gas heating means, means dependent upon the condition of the metal in the pot to release said control means, and an electric switch operated by said dependent means to switch off and on the electric heater, a supply switch, electric devices for operating the supply switch and circuits connected to said electric devices, a hand switch in the latter circuits, and a circuit control device operated by said dependent means to automatically open and close current to said electric heater when said hand switch is closed.

7. The combination with a melting pot for typographic machines and gas heating means therefor; of control means for the gas heating means, electric heaters for the pot, electric circuits for the heaters, and means dependent upon the condition of the metal in the pot to control at least one of the electric heaters and the control means for the gas heating means.

8. The combination with a melting pot for typographic machines and gas heating means therefor; of control means for the gas heater, electric heaters for the pot and a circuit for at least one of the heaters and
a separate circuit for at least another one
of the heaters, control means in the latter
circuit whose operation is dependent upon
the condition of the metal in the pot to
send current to or from the latter heater, a
supply switch to control current to all the
heater circuits, means to automatically operate
said switch controlled by the latter
control means, a signal and a signal circuit,
said signal circuit and gas control means
also controlled by the latter control means.

9. The combination with a melting pot for
typographic machines and a gas heater
therefor; of a time train operated valve for
the gas heater, a flexible electric heater for
the mouth of the pot, means to adjust said
heater in whole and in part with relation
to the mouth of the pot, an electric circuit
for the heater, another heater for the interior
of the pot, a circuit therefor, a thermostat
heated from the pot, a switch in the
latter circuit operated by the thermostat,
and means operated by the thermostat to
release said train.

10. The combination with a melting pot
for typographic machines and a gas heater
therefor; of electric heaters for the pot, a
switch for said heaters, a time train operated
cock for the gas heater, a thermostat
heated from the metal in the pot to release
the time train and operate said switch,
means to adjust the time of operation of the
switch and means to adjust the release of
the time train.

11. The combination with a melting pot
for typographic machines, gas heating
means therefor, and heating flues for the
hot gases; of electrical heating units in said
flues and mechanism dependent upon the
temperature of the metal in the pot to control
the supply of current to said heating
units and also to control the supply of gas
to the gas heating means, said mechanism
operating automatically to cut in one heating
means when the other fails.

In testimony that I claim the foregoing
as my invention, I have signed my name
this 12th day of March 1928.

THEODOR BADER.